United States Patent [19]
Tarpley, Jr.

[11] 4,150,576
[45] Apr. 24, 1979

[54] MINE ROOF AND WALL INSPECTION APPARATUS AND METHOD

[75] Inventor: William B. Tarpley, Jr., West Chester, Pa.

[73] Assignee: Energy and Minerals Research Co., Kennett Square, Pa.

[21] Appl. No.: 845,178

[22] Filed: Oct. 25, 1977

[51] Int. Cl.² ........................................... G01N 29/04
[52] U.S. Cl. ........................................ 73/594; 73/644
[58] Field of Search ................................ 73/594–596, 73/600, 624, 627, 629, 644; 181/101, 104, 105, 108, 123, 124; 340/15.5 TN

[56] References Cited

U.S. PATENT DOCUMENTS

| | | | |
|---|---|---|---|
| 2,280,226 | 4/1942 | Firestone | 73/627 |
| 2,549,076 | 4/1951 | Gallagher et al. | 73/594 |
| 2,728,405 | 12/1955 | Bryant | 73/598 X |
| 2,891,178 | 6/1959 | Elmore | 310/26 |
| 3,552,191 | 1/1971 | Heseding | 73/624 |
| 3,616,682 | 11/1971 | Golis et al. | 73/642 X |
| 3,741,003 | 6/1973 | Gunkel | 73/644 X |
| 3,961,307 | 6/1976 | Hochheimer et al. | 181/104 X |

*Primary Examiner*—Stephen A. Kreitman
*Attorney, Agent, or Firm*—Seidel, Gonda, Goldhammer & Panitch

[57] ABSTRACT

The roof and walls of a mine are inspected for fissures, channels and other geological structure by use of a vibratory energy transmitter and a vibratory energy receiver each of which are forced into contact with the wall or roof by a jack with little or no loss of vibratory energy. The frequency of vibration is between 10 and 100 kilohertz.

13 Claims, 7 Drawing Figures

MINE ROOF AND WALL INSPECTION APPARATUS AND METHOD

BACKGROUND

The geological periods during which coal and other materials which must be mined underground were formed were periods also conductive to shale, sandstone and limestone formation in contact therewith and sometimes interlayered with such materials. These rock structure materials vary greatly from site to site and many are mechanically weak and/or fragile. It is well known that mining under a roof of weak rock is frought with hazards. Hundreds of men are killed each year in mine cave-ins.

With present inspection methods, very little is known about the superstructure properties of a specific mine roof as mining progresses. Visually, only those cracks which intersect the walls or roof of the mine can be observed. Fissures, channels and other geological structure lying approximately parallel to the wall or roof of the mine are undetectable. The miner's traditional sight, sound and vibration techniques wherein the miner taps the wall or roof and uses fingertip detection are highly subjective and at the same time are useless in some roof configurations. One attempt to mechanize such inspection is disclosed in U.S. Pat. No. 2,549,076. While the teachings of said patent may be an improvement over tapping and fingertip detection which is still being used today, it has many disadvantages and is limited in its ability to facilitate its intended object. For example, the teachings of said patent require two test stations, one of which includes an area of rock of known strength.

Ultrasonic non-destruction inspection devices for inspecting or testing metal parts at frequencies in the megahertz range are known. Such devices are unadaptable to testing the walls or roof superstructure of a mine. Seismic testing of geologic structure such as continental shelves and mountain ranges is also well known and is accomplished at very low frequencies to achieve long distance penetration. For example, see U.S. Pat. Nos. 3,226,535 and 3,938,072. The low frequencies associated with such seismic testing are unadaptable for mine inspection.

There is a need for a rugged inspection apparatus having a lobed beam for inspecting geological structure behind walls and roofs in mines.

SUMMARY OF THE INVENTION

The present invention is directed to apparatus and method for inspecting mine roofs and walls for ascertaining non-visible geological structure beyond the surface of the roofs and walls. The apparatus includes a vibratory energy transmitter and a vibratory energy receiver which can be forced into contact with the wall or roof by a force-applying means with little or no loss of vibratory energy. The frequency of vibration for the transmitter and receiver is between 10 and 100 kilohertz. The transmitter and receiver have a lobed beam pattern which overlap at the zone of inspection.

It is an object of the present invention to provide novel apparatus and method for inspection of mine roofs and walls to ascertain geological structure not visible on the surface on the roofs and walls.

It is another object of the present invention to provide novel apparatus and method for ultrasonically inspecting the roof and walls of coal mines for ascertaining the nature and extent of geological structure including sand or weakly cemented sandstone filled channels and scour marks, abrupt pinch-outs or wedging of strata, weak bonding between thinly laminated strata, poorly cemented friable sandstone, shale which is both fragile and moisture sensitive, moisture causing exfolliation as clay swells and contracts due to alternating high and low humidity situations, as well as faults and inclusion bodies in the overlying strata or in the coal seam itself.

Other objects will appear hereinafter.

For the purpose of illustrating the invention, there is shown in the drawings a form which is presently preferred; it being understood, however, that this invention is not limited to the precise arrangements and instrumentalities shown.

Figure 1:
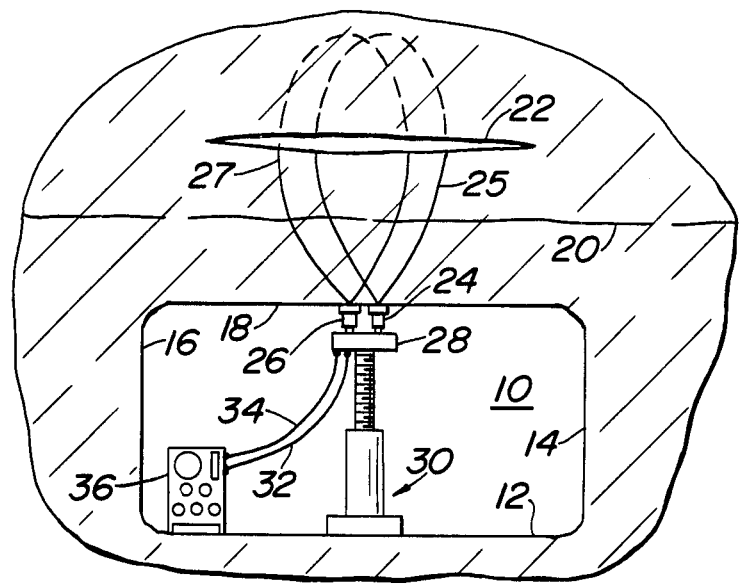
FIG. 1 is a diagrammatic ilustration of a mine wherein apparatus of the present invention is illustrated for practicing the present invention.

Referring to the drawings in detail, wherein like numerals indicate like elements, there is shown in FIG. 1 a mine 10 having a floor 12, side walls 14, 16 and a roof 18. Apparatus in accordance with the present invention is provided in the mine 10 for ascertaining the nature and location of geological structures such as fissure 20 and channel 22.

The apparatus of the present invention includes a vibratory energy transducer in the form of a transmitter 24 and a receiver 26 mounted close together (one to six inches apart) on a common support plate 28. Support plate 28 is mounted on a movable element of a mechanical or hydraulic jack 30. The transmitter 24 and receiver 26 are connected by way of cables 32, 34, respectively to a power supply 36. The power supply 36 may be mounted on a wheeled dolly to facilitate movement along the mine floor 12. Likewise, the jack 30 may be mounted on a wheeled dolly to facilitate movement of the same. The lobe of the transmission beam pattern from transmitter 24 is designated 25 and the lobe of the beam transmission pattern received by receiver 26 is designated 27.

During testing, it is essential to have the transmitter 24 and receiver 26 maintained stationary and in good physical contact with the surface of the roof 18. Where necessary the surface of the roof 18 should be scraped or otherwise rendered smooth in the area which contacts the end face of the transmitter 24 and receiver 26.

Figure 5:
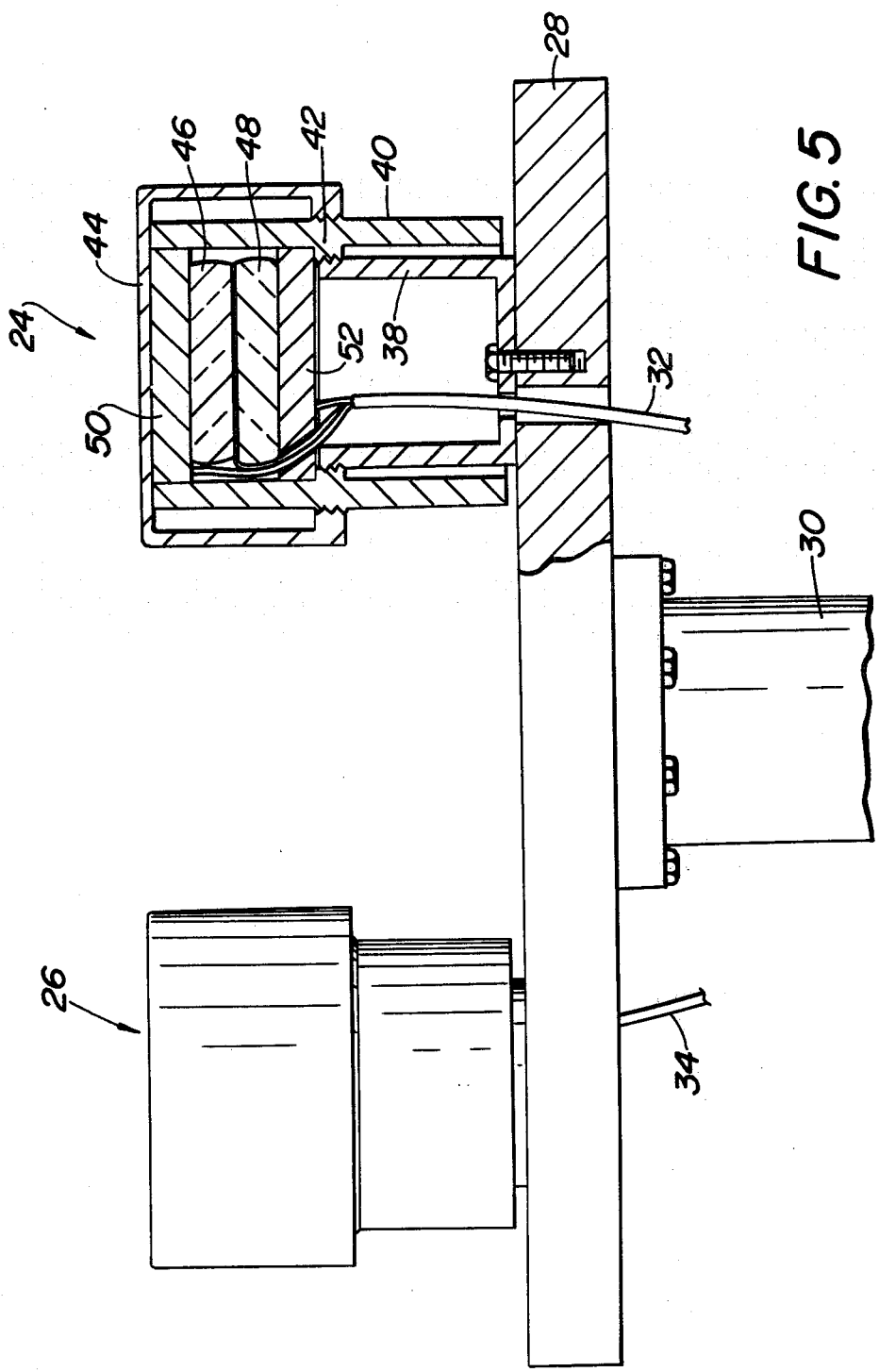
FIG. 5 is an enlarged partially sectional view of the support for the transmitter and receiver shown in FIG. 1.

Referring to FIG. 5, it will be noted that the support plate 28 is rigid and bolted to the upper end of the jack 30. The transmitter 24 and receiver 26 are each removably secured to the upper surface of plate 28. The transmitter 24 and the receiver 26 have an explosion-proof, dust-tight housing. Since the construction of the transmitter and receiver is the same, only the details of transmitter 24 will be described hereinafter.

The housing for transmitter 24 includes a cup-shaped member 38 bolted to the plate 28. The upper end of member 38 is rigidly secured to an inwardly directed flange 42 on a force-insensitive mount 40. Per se, a force-insensitive mount is known. For example, see U.S. Pat. No. 2,891,178. A force-insensitive mount is a resonant member having a length equivalent to an even multiple of one-quarter wave lengths of the material of which it is made at the frequency of operation of the source to which it is attached. Thus, above the flange 42, the mount 40 preferably has a length corresponding to one (or any other odd whole number) quarter wave length for longitudinal vibration above flange 42. Below flange 42, the mount 40 has a length which is any odd number multiplied by the quarter wave length in a longitudinal vibration to thereby enable a transducer to be supported for vibration in a longitudinal mode with little or no vibratory energy be transmitted to the support plate 28.

A clamp ring and wear plate 44 is provided. Element 44 is generally cup-shaped and threaded to threads on the outer periphery of mount 40 at a location opposite the flange 42 so that element 44 may apply pressure to transducers 46, 48 which are preferably piezo electric ceramic wafers. One of the leads from cable 32 extends to the interface between the wafers 46, 48 and is in good electrical contact therewith. The wafers 46, 48 are clamped between metal disks 50 and 52. A discrete ground lead from cable 32 is connected to each of the disks 50, 52. Disk 52 is supported by the flange 42.

While the transmitter 24 is described above as being resonant in a longitudinal mode, it will be apparent to those skilled in the art that other transducer configurations such as one resonant in a radial mode may be utilized. Each of the transmitter 24 and its receiver 26 must have the same mode. Also, the transmitter may be an array of transducers. Other types of vibratory energy transducers may be utilized in place of piezo electric ceramic wafers.

Figure 2:
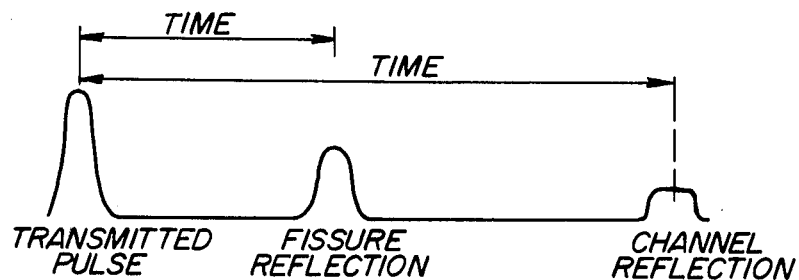
FIG. 2 is a schematic representation of a pulse as received on an oscilloscope or recorder.
Figure 4:
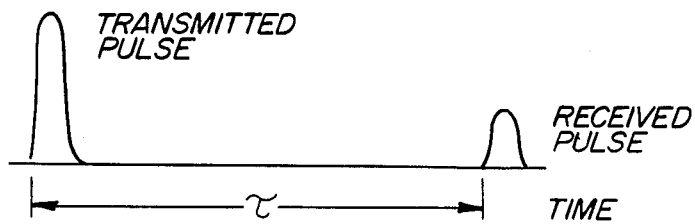
FIG. 4 is a schematic illustration of a pulse as received on an oscilloscope or recorder.

The power supply 36 for operating in the frequency range of 10 to 100 kilohertz is conventional and may include an oscilloscope having a camera for recording the pulse time reflection measurements such as those shown in FIGS. 2 and 4 or may include a recorder for recording such pulse time reflection measurements. The pulse time reflection measurements reveal the approximate distance between any unseen discontinuity of a geological nature and the surface of the roof 18 or walls 14, 16. The amount of attenuation of such measurements reveal the degree of cementation of the roof or wall structure. A lobed beam at the above-mentioned frequencies can survey the rock strata and detect thin cracks. Since there is a maximum reflection from such discontinuity, the frequency is in the 10 to 100 kilohertz region to have minimum attenuation losses in the beam pattern. The apparatus is rugged and portable so that it may be used in mines by mining personnel. The jack 30 facilitates rapid implacement of the apparatus for jacking the wear plates 44 into intimate contact with a surface of the mine 10 and for holding the transmitter and receiver stationary during pulsing.

Poorly cemented sandstone will have high ultrasonic attenuation. Ultrasonic measurements through known path lengths will identify relative strength and extent of such layers. Each of the other troublesome rock structures will exhibit ultrasonic reflections and refractions due to changes in the acoustic properties between lamina, strata and channels. Many coal mine roofs are composed of layers of shale which are friable and moisture sensitive. Seasonal changes in the temperature and relative humidity of the air can cause clay swelling and contraction. Interbedding of hardened soft material such as limestones or sandstones and shales or clays form treacherous structures. Ultrasonic pulses will be partially reflected by thin soft layers thus making the presence of these layers clearly known and their extent definable.

The apparatus 10 may also be deployed in a horizontal manner by forcing the transmitter and receiver into intimate contact with the side wall which is coal, or the forward projection of the working face which is coal. To do this, the jack 30 will be deployed in a horizontal manner, pressing against the opposite wall or against a vertical piller extending from floor 12 to roof 18. It is thus possible to inspect the side walls or the coal seam ahead of the working face and determine whether there are serious inclusions, voids, or sand-filled chambers or the like which would cause damage to mining equipment if struck inadvertently during the penetration into these portions of the coal seam.

The hidden geological structure beyond the wall being inspected and disposed in the overlapped patterns 25, 27 will reflect pulses of vibratory energy to the receiver 26 from which the pulse time reflection measurements are attained. The range of 20° to 50° is a practical operating range for the width of the patterns 25, 27 when practicing the present invention. By scanning adjacent portions of a roof, a map may be made of the geological structure above the entire roof 18 of the mine 10.

In order to accurately interpret the time pulse reflection measurements, it is necessary to know the acoustic velocity in the roof structure. The acoustic velocity of the roof structure is readily measured by using a wedge transmitter and a wedge receiver. See FIG. 3 wherein there is illustrated a wedge transmitter 54 and a wedge receiver 56 each positioned in intimate contact with the roof 18 of the mine. Transmitter 54 is provided with a force-insensitive mount 58 and receiver 56 is provided with a similar force-insensitive mount 60. The mounts 58, 60 are similar to and perform the same function as mount 40. The mounts 58 and 60 are supported by a telescoping horizontally disposed beam 62 mounted on a jack 64.

The transmitter 54 and receiver 56 are remote from one another (2 to 20 feet) and spaced an exactly measured substantial distance apart such as 10 feet. Transmitter 54 has a beam pattern whose length is greater than the linear distance from transmitter 54 to receiver 56. If desired, each of the transmitter 54 and receiver 56 may be provided with a separate jack. It will be noted that a large conical volume generally parallel to roof 18 will be scanned by the arrangement in FIG. 3. The transmitter and receiver may be the same as set forth above except for the angular arrangement and the beam pattern.

By measuring of the time of transit of a pulse from the transmitter 54 to reach receiver 56 located a known distance apart in this configuration, the sound velocity in the accessible portion of the mine roof can be measured and used in the calculation of distance from fissures, channels, or other reflecting discontinuities using the measurements obtained with apparatus 10 and described above. Based on said sound velocity, transparent overlays may be prepared of time versus distance. Such an overlay may be superimposed over the pulse time reflection measurements as shown in FIG. 2 whereby the distance from the mine surface of hidden geological structure can be readily noted. It is also possible to measure the attenuation of the signal as it is transmitted over this distance and in this way determine the degree of cementation of the roof stone in the layers adjacent to the exposed mine roof 18.

Figure 3:
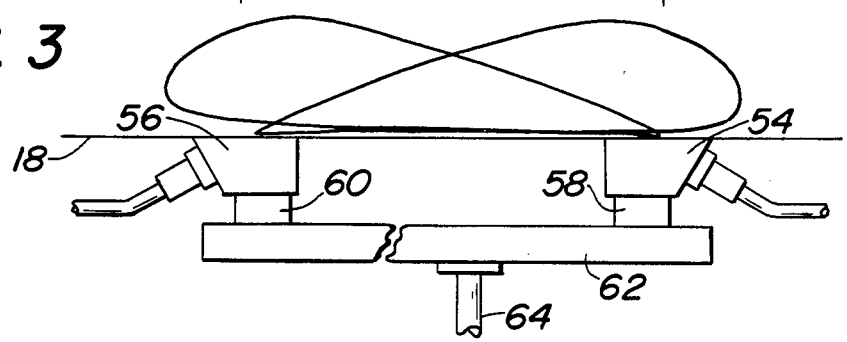
FIG. 3 is a schematic illustration of wide-angle transducers.
Figure 6:
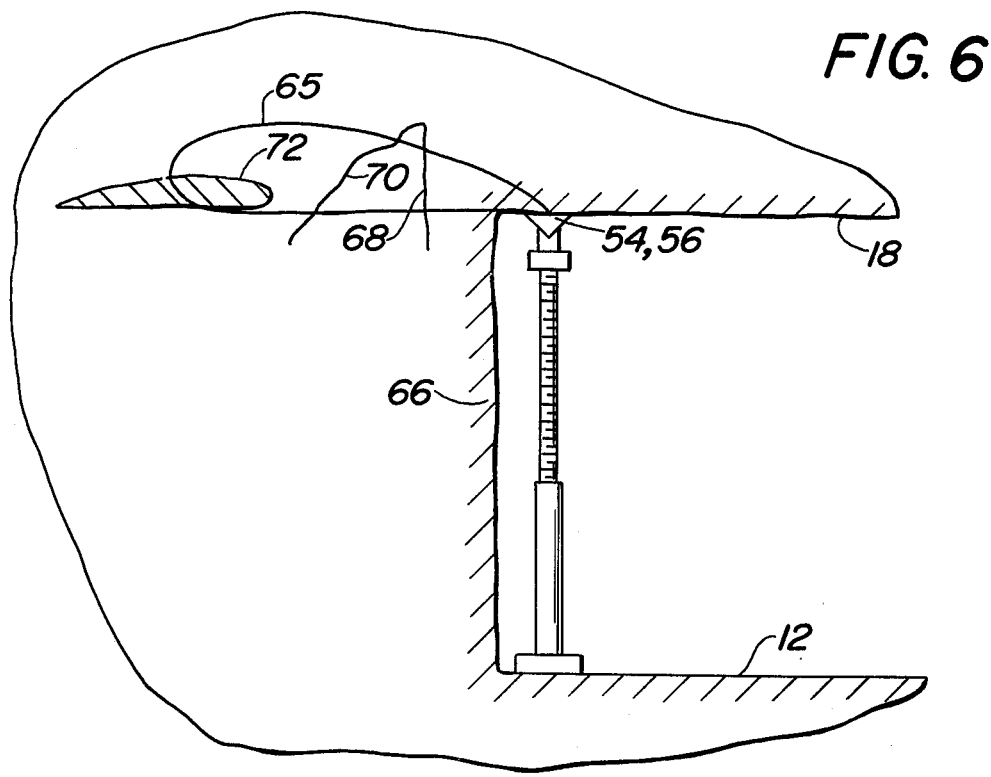
FIG. 6 is a diagrammatic illustration showing use of the present invention for scanning the roof region of a seam to be mined.
Figure 7:
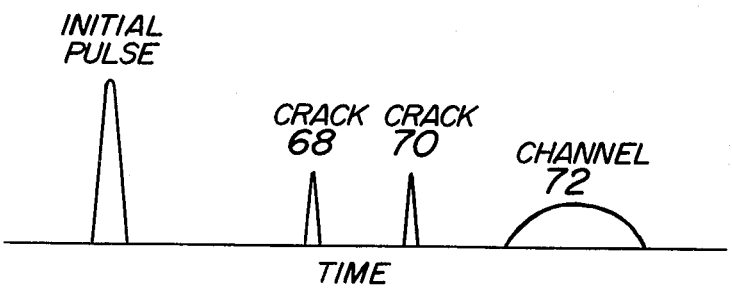
FIG. 7 is a schematic representation of a pulse as received on an oscilloscope in connection with FIG. 6.

If the wedge transmitter 54 and receiver 56 shown in FIG. 3 are supported close together in the manner described above in connection with FIG. 1 and the lobes 65 are directed in the same direction, it is possible to effect a scan of the mine roof above a yet unremoved coal seam 66. Thus, by the above described technique, it is possible to determine the presence of gas pockets, weak formations, and the like before the working face is removed and thus permit corrective action to be taken to minimize the damaging results of rock falls, roof slides, sand slides, and the like. In FIG. 6, there is illustrated a first crack 68, a second crack 70 and a sand filled channel 72 in the roof region above the seam 66 to be mined. The reflected pulses of cracks 68, 70 and of the channel 72 are shown in FIG. 7.

In addition to concern with respect to the structure of the roof region of the seam to be mined, there is also concern with abandoned wells or mines, and underground streams which intersect the seam to be mined. Structures such as a gas filled abandoned well can be hazardous if it is suddenly escavated into. The embodiment of FIG. 6 may be used as described above to detect such structures beyond the face of the seam to be mined.

The present invention may be embodied in other specific forms without departing from the spirit of essential attributes thereof and, accordingly, reference should be made to the appended clailms, rather than to the foregoing specification as indicating the scope of the invention.

What is claimed is:

1. Apparatus comprising a vibratory energy transmitter for transmitting vibratory energy with a lobed pattern into a surface of a mine, a vibratory energy receiver having a lobed pattern which can overlap said transmitter pattern, each of said transmitter and receiver having a resonant frequency between 10 and 100 kilohertz, a discrete force-insensitive mount connecting each of said transmitter and receiver of a support means, and adjustable means connected to said support means for forcing said transmitter and receiver into intimate contact with a surface of a mine.

2. Apparatus for inspecting the roof, walls or mineral seam of a mine to ascertain hidden geological structure comprising a vibratory energy transmitter for transmitting vibratory energy with a lobed pattern into a surface of a mine and a vibratory energy receiver having a lobed pattern which can overlap said transmitter pattern and for receiving reflections from structure in said pattern overlap, each of said transmitter and receiver having a resonant frequency between 10 and 100 kilohertz, a discrete force-insensitive mount connecting each of said transmitter and receiver to a support means so that minimal vibratory energy is transmitted to said support means, adjustable means for forcing said transmitter and receiver into intimate contact with a surface of a mine and means for recording pulse time reflection measurements with respect to the reflections received by said receiver and from which the general nature and approximate location of hidden geological structure may be ascertained.

3. Apparatus in accordance with claim 2 wherein said receiver and transmitter each include a dustproof, explosion proof housing connected to a radially disposed flange of its force-insensitive mount.

4. Apparatus in accordance with claim 2 wherein said adjustable means is a jack coupled to said support means, said jack being extensible in length so that it can be supported on a floor of a mine and wherein said surface is the roof of the mine.

5. Apparatus in accordance with claim 2 wherein said transmitter and receiver have a wide angle lobed pattern.

6. Apparatus in accordance with claim 2 wherein said transmitter and receiver are spaced from one another by a known measured distance.

7. A method for inspecting a wall of a mine to ascertain hidden geological structure comprising providing a force-insensitive mount for a vibratory energy transmitter and a vibratory energy receiver each of which are resonant between 10 and 100 kilohertz, forcing each of said transmitter and receiver into intimate contact with a surface of a mine by way of said force-insensitive mount, transmitting vibratory energy from said transmitter in a directional lobed pattern through said surface into the surrounding region, directing a lobed pattern of said receiver so that its pattern overlaps said transmitter pattern, reflecting pulses of energy from said transmitter off geological structure in said pattern overlap to said receiver, producing pulse time reflection measurements of the reflected pulses received by said receiver, and using said measurements to ascertain the general nature and approximate location of geological structures beyond said surface.

8. A method in accordance with claim 7 wherein said surface is adjacent the seam being mine, causing said patterns to overlap in the roof region above the seam to be mined.

9. A method in accordance with claim 7 including measuring the velocity of vibratory energy in said surface by transmitting a pulse of vibratory energy from a transmitter through and generally parallel to said surface directly to a receiver spaced from said transmitter by a known distance.

10. A method in accordance with claim 7 including measuring attenuation of said pulse measurements.

11. A method of inspecting a mine to ascertain hidden geological structure comprising measuring the velocity of sound in a roof region of a mine, providing a force-insensitive mount for a vibratory energy transmitter and a vibratory energy receiver each of which are resonant between 10 and 100 kilohertz, forcing each of said transmitter and receiver into intimate contact with a roof surface of said mine by way of said force-insensitive mount, transmitting vibratory energy from said transmitter in a directional lobed pattern through said surface into the surrounding region, directing a lobed pattern of said receiver so that its pattern overlaps said transmitter pattern, reflecting pulses of energy from said transmitter off geological structure in said pattern overlap to said receiver, producing pulse time reflection measurements of the reflected pulses received by said receiver, and using said measurements and velocity to ascertain the identity and location of geological structures beyond said surface.

12. A method in accordance with claim 11 including causing said patterns to overlap in the roof region above the seam to be mined.

13. A method comprising:
  (a) inspecting the region above a seam to be mined for hidden geological structure such as sand, weakly cemented sandstone, abrupt pinch outs or wedging of strata, weak bonding between thinly laminated strata, poorly cemented friable sandstone, shale, faults, voids, and/or gas pockets,
  (b) said inspecting step including measuring the velocity of sound in said region, providing a force-insensitive mount for a vibratory energy transmitter and a vibratory energy receiver each of which are resonant between 10 and 100 kilohertz, forcing each of said transmitter and receiver into intimate contact with a surface of said mine by way of said force-insensitive mount, transmitting vibratory energy from said transmitter in a directional lobed pattern through said surface into said region, directing a lobed pattern of said receiver so that its pattern overlaps said transmitter pattern in said region, reflecting pulses of energy from said transmitter off geological structure in said pattern overlap to said receiver, producing pulse time reflection measurements of the reflected pulses received by said receiver, and
  (c) using said pulse time reflection measurements and velocity to ascertain the identity and location of geological structures beyond said surface.